US005712750A

United States Patent [19]
Kim

[11] Patent Number: 5,712,750
[45] Date of Patent: Jan. 27, 1998

[54] ACTUATOR FIXING DEVICE OF HARD DISK DRIVE

[75] Inventor: Youn-Tai Kim, Seoul, Rep. of Korea

[73] Assignee: SamSung Electronics Co., Ltd., Kyungki-do, Rep. of Korea

[21] Appl. No.: 520,436

[22] Filed: Aug. 29, 1995

[30]      Foreign Application Priority Data

Oct. 28, 1994 [KR]   Rep. of Korea ............... 27964/1994

[51] Int. Cl.$^6$ ...................................... G11B 5/54
[52] U.S. Cl. ........................................... 360/105
[58] Field of Search ........................ 360/75, 105, 106, 360/97.01

[56]            References Cited

U.S. PATENT DOCUMENTS

| | | | |
|---|---|---|---|
| 4,160,268 | 7/1979 | Goto et al. | 360/77.02 X |
| 4,764,831 | 8/1988 | Patel | 360/105 |
| 4,881,139 | 11/1989 | Hazebrouck | 360/105 |
| 4,989,108 | 1/1991 | Chang | 360/105 |
| 5,023,736 | 6/1991 | Kelsic et al. | 360/105 |
| 5,162,959 | 11/1992 | Arin et al. | 360/105 |
| 5,187,627 | 2/1993 | Hickox et al. | 360/105 |
| 5,208,713 | 5/1993 | Lindsay et al. | 360/105 |
| 5,231,556 | 7/1993 | Blanks | 360/105 |
| 5,303,101 | 4/1994 | Hatch et al. | 360/105 |
| 5,319,511 | 6/1994 | Lin | 360/105 |
| 5,341,259 | 8/1994 | Amirkiai et al. | 360/105 |
| 5,343,346 | 8/1994 | Bleeke | 360/105 |
| 5,361,182 | 11/1994 | Sampietro et al. | 360/105 |
| 5,363,261 | 11/1994 | Eckberg et al. | 360/105 |
| 5,365,389 | 11/1994 | Jabbari et al. | 360/105 |
| 5,414,577 | 5/1995 | Arin et al. | 360/105 |
| 5,448,435 | 9/1995 | Nakazawa et al. | 360/105 |
| 5,452,162 | 9/1995 | Campbell et al. | 360/105 |
| 5,460,334 | 10/1995 | Joung | 360/85 X |
| 5,523,912 | 6/1996 | Koriyama | 360/105 X |
| 5,566,375 | 10/1996 | Isomura | 360/106 X |

Primary Examiner—Andrew L. Sniezek
Attorney, Agent, or Firm—Robert E. Bushnell, Esq.

[57]              ABSTRACT

An actuator fixing device of a hard disk drive includes an actuator having a permanent magnet; a solenoid latch composed of a damper for buffering an impact resulting from contact with the permanent magnet, a coil for applying an electrical current, and an iron rod bound with the coil to generate an electromagnetic force upon application of the electrical current; and a yoke for installing the solenoid latch. The solenoid latch of the actuator fixing device exerts a repulsive force upon the permanent magnet when the electrical current is applied to the coil of the solenoid latch, thereby separating the actuator from the solenoid latch. When the electrical current is interrupted, the permanent magnet is attracted to the iron rod of the solenoid latch, thereby fixing the actuator to the solenoid latch.

17 Claims, 7 Drawing Sheets

ACTUATOR FIXING DEVICE OF HARD DISK DRIVE

CROSS-REFERENCE TO RELATED APPLICATIONS

This application makes reference to, incorporates the same herein, and claims all benefits accruing under 35 U.S.C. §119 from an application for *Actuator Fixing Device Of Hard Disk Drive* earlier filed in the Korean Industrial Property Office on 28 Oct. 1994 and assigned Ser. No. 27964/1994.

BACKGROUND OF THE INVENTION

The present invention relates to a hard disk drive used as an auxiliary memory device in a computer, and more particularly, to an actuator restraining apparatus of a hard disk drive for maintaining an actuator of the hard disk drive in a parking zone while the actuator is not in operation.

The hard disk drive, which is constructed from electrical and mechanical units, is a memory device capable of recording and reproducing data using digital electric pulses. A head functions as an electromagnet to record and reproduce data on and from a magnetic disk. When recorded data is read from the magnetic disk, magnetized data is converted into an electromagnetic signal. Performance of these operations is enabled by a drive mechanism of the hard disk drive. In the layout of the drive mechanism, is it important to design a latch unit capable of precisely performing an automatic parking operation. Latch units typically employ methods such as, a latch method, a magnet method, and an air method, among other techniques.

When an electrical current is applied to the hard disk drive, the head of the actuator moves along the surface of the magnetic disk from a parking zone into a data zone, to thereby record or reproduce data. When the application of electrical current to the hard disk drive is interrupted, electrical current supplied to a spindle motor is cut off, but the disk continues to rotate from residual inertia, thereby producing a reverse electromagnetic force which moves the head of the actuator into the parking zone. This type of parking is referred to as an automatic parking method.

U.S. Pat. No. 5,363,261 entitled *Disk Drive Actuator Latch* issued to Eckberg et al. on 8 Nov. 1994 discloses a magnetic bistable latch mechanism for latching the actuator of a disk drive in a parked position. The latch includes a magnetically detented latch lever which engages and latches a latch arm in the parked position. The latch arm is part of an actuator motor structure and accordingly latches the actuator motor. The latch lever is held in either the latched or unlatched position by a magnetic attraction. While this type of conventional art provides a modicum of advantage in its own right, I believe that an improved device can be contemplated where the problem of the actuator escaping from its parked position can be adequately addressed.

SUMMARY OF THE INVENTION

It is therefore an object of the present invention to provide an improved actuator restraining device for a hard disk drive.

It is another object to provide an actuator restraining device for a hard disk drive in which the head can be securely maintained within the parking zone on a disk.

It is still another object to provide an actuator restraining device for a hard disk drive in which the head is safely fixed within a parking zone on a disk by using a permanent magnet and a solenoid latch.

It is yet another object to provide an actuator restraining device for a hard disk drive capable of easily moving the head into a data zone on the disk upon application of an electrical current to the solenoid latch.

To achieve these and other objects, there is provided an actuator restraining device for a hard disk drive constructed according to the principles of the present invention. In the actuator restraining device according to the present invention, the actuator has a permanent magnet, and the solenoid latch of an electromagnet uses a coil and an iron rod bound with the coil. When an electrical current is applied to the hard disk drive, the solenoid latch having the same polarity as the permanent magnet generates a repulsive force between the permanent magnet and the solenoid latch, and thus the permanent magnet and the solenoid latch are easily separated from each other. Similarly, when the electrical current is interrupted, since the repulsive force generated by the solenoid latch is removed, the head of the actuator is strongly maintained within a parking zone on a disk by the force of the permanent magnet.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
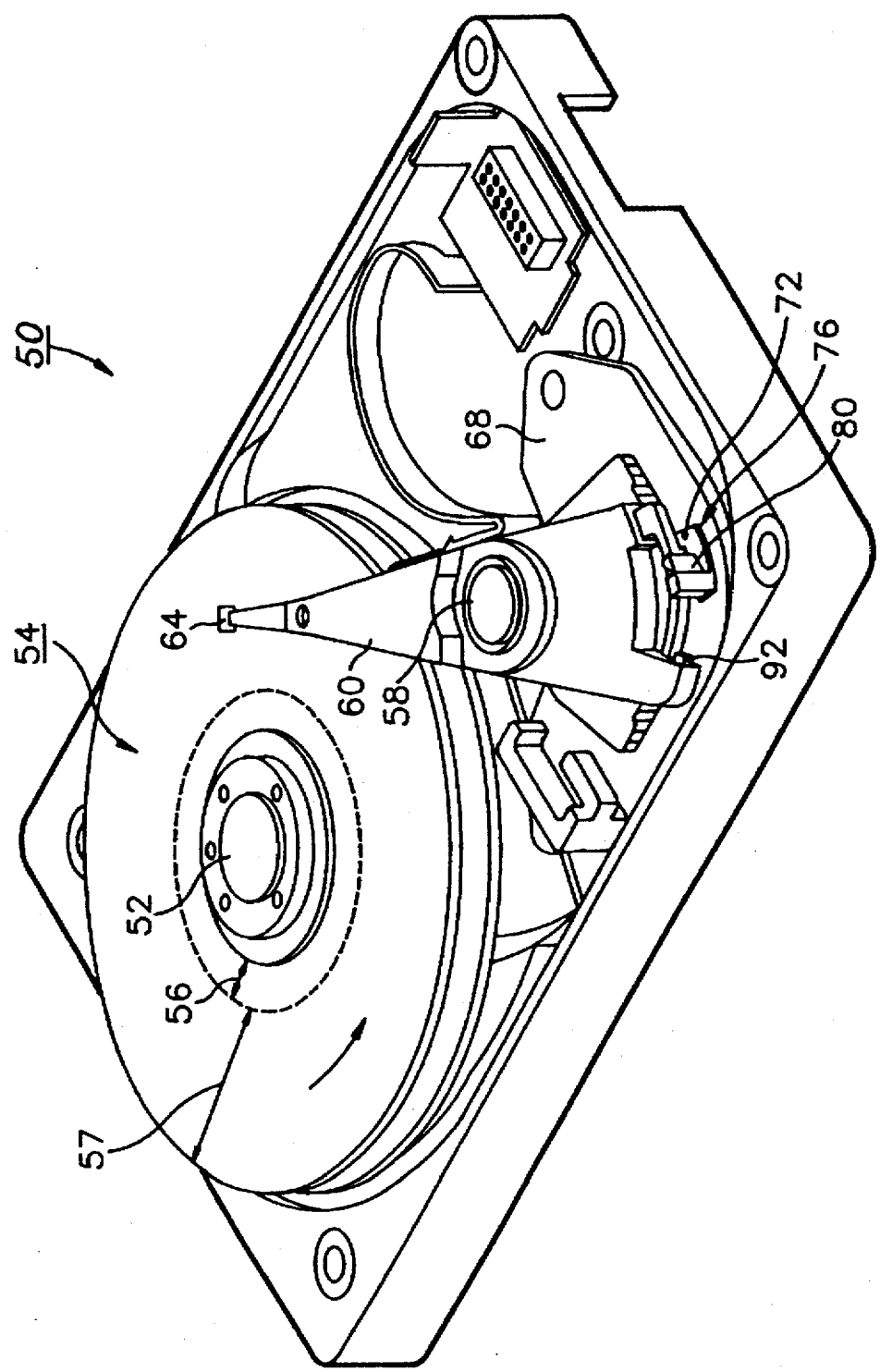
FIG. 1 is a perspective view illustrating the general construction of an actuator fixing device of the type that may be found in a conventional hard disk drive.

Turning now to the drawings, FIG. 1 is a perspective view illustrating the general construction of a conventional hard disk drive 50 using a magnetic latch method. The actuator fixing device of conventional hard disk drive 50 shown in FIG. 1 is composed of an actuator 60 having a metal plate 92 and a latch assembly 76 having a permanent magnet. Permanent magnet is surrounded with a parking crash stop composed of a rubber material, and is assembled to latch assembly 76. Actuator 60 is rotatable upon a pivot 58 and latch assembly 76 is positioned upon a lower yoke 68. An axis 72 is provided for attaching latch assembly 76 to lower yoke 68, and a supporting member 80 is further provided for preventing displacement of latch assembly 76.

In the conventional actuator latching device of the type represented by FIG. 1, as the application of electrical current is interrupted, operation of a spindle motor 52 is halted, but a disk 54 continues to rotate via residual inertia. Then, a head 64 of actuator 60 is moved to a parking zone 56 on disk 54 by a reverse electromagnetic force, and metal plate 92 of actuator 60 attaches to permanent magnet of latch assembly 76.

In the actuator latching device of conventional hard disk drive 50 shown in FIG. 1, many problems often arise. First, head 64 may easily escape from parking zone 56 during periods of non-operation, and in cases when a relatively strong permanent magnet is used for performing a safe parking operation, a problem often results because head 64 of actuator 60 may not be able to readily move into a data zone 57 on disk 54 after electrical current is applied to hard disk drive 50. Accordingly, hard disk drive 50 is unable to operate effectively. Furthermore, when an external impact is applied to hard disk drive 50 after the automatic parking of head 64, parking crash stop being composed of a rubber material weakens a magnetic force of permanent magnet. This results in a problem in that head 64 of actuator 60 often escapes from parking zone 56 and damages data recorded in data zone 57, thereby causing an operational state of hard disk drive 50 to be degraded.

Figure 2:
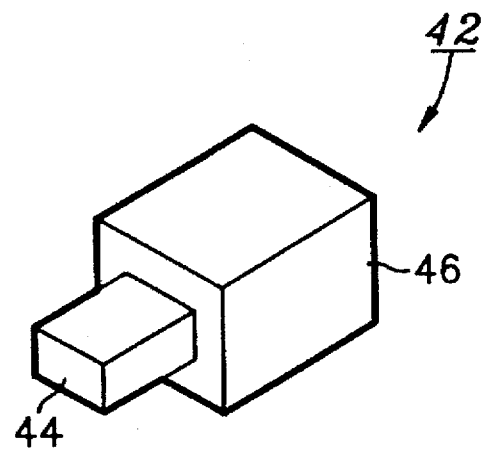
FIG. 2 is a perspective view illustrating a permanent magnet constructed according to the principles of the present invention.
Figure 3:
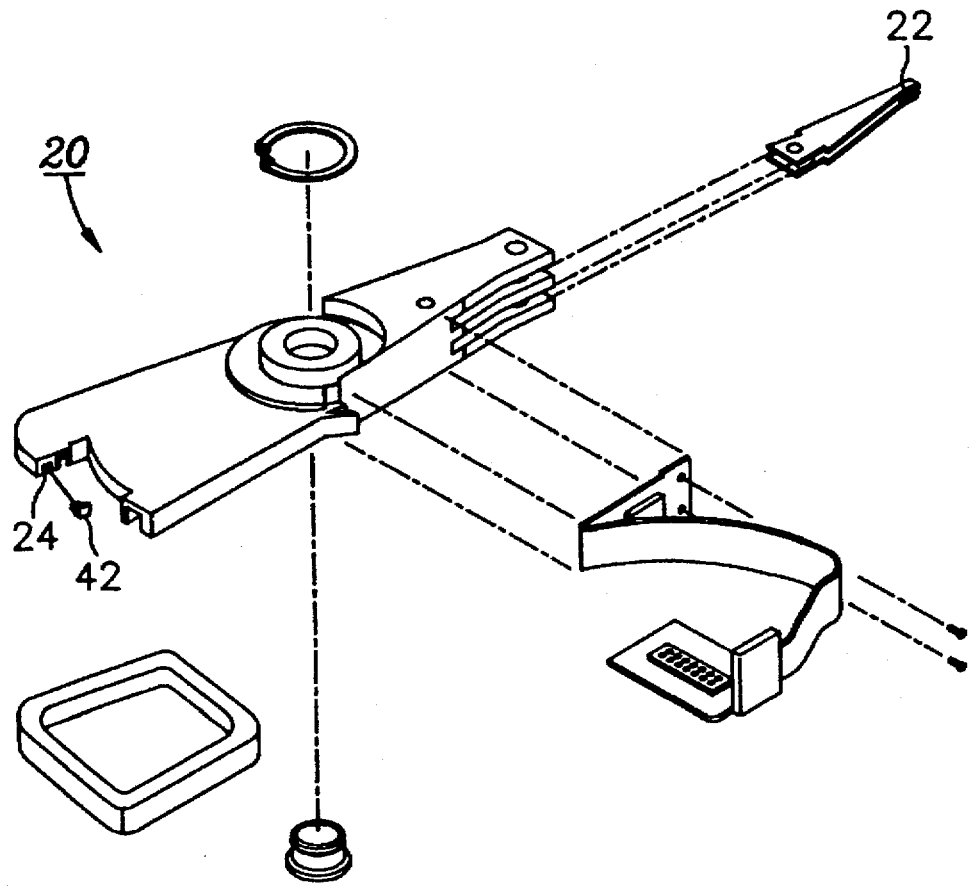
FIG. 3 is an exploded perspective view illustrating an assembly of an actuator and a permanent magnet in accordance with the principles of the present invention.

Referring now to FIGS. 2 through 6, an actuator restraining device of a hard disk drive 10 constructed according to the principles of the present invention is shown. An actuator 20 includes an assembly groove 24 having a square shape for receiving a permanent magnet 42, as shown in FIG. 3. Permanent magnet 42 may use two parts each having different sizes in order to facilitate the discrimination of polarities and an assembly process, as shown in FIG. 2. One side of permanent magnet 42 will have an assembly portion 44 that inserts into assembly groove 24 of actuator 20, and the other side will have a contact portion 46.

Figure 4A:
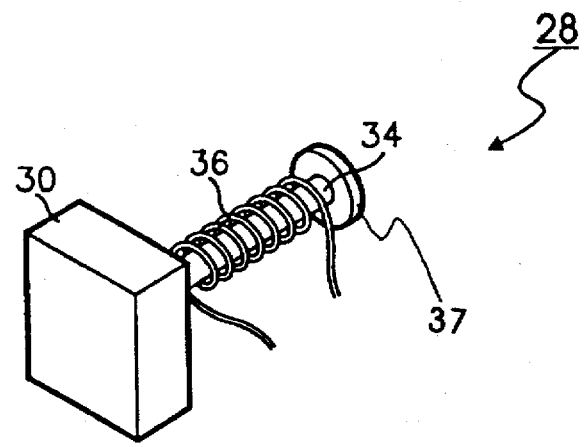
FIGS. 4A to 4C are perspective views illustrating several different embodiments of a solenoid latch constructed according to the principles of the present invention.
Figure 4B:
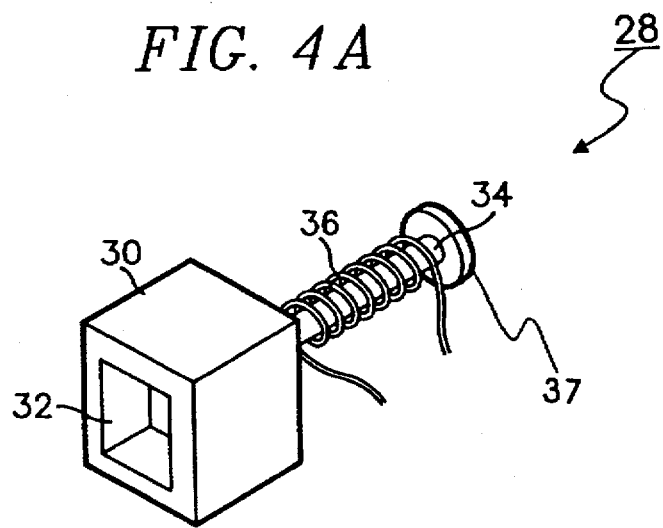
Figure 4C:
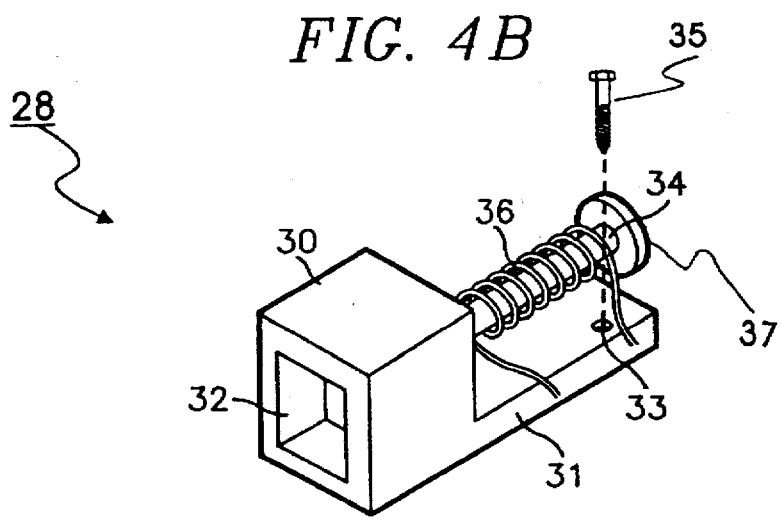

A solenoid latch 28 has the same polarity as permanent magnet 42, to thereby generate a repulsive force when an electrical current is applied to solenoid latch 28. Referring now to FIGS. 4A through 4C, solenoid latch 28 uses a damper 30 connected to an iron rod 34 helically wrapped with a coil 36. Damper 30 may be formed as a square or rectangular plate, as shown in the embodiment of FIG. 4A, and may be formed to include a groove 32 on a first end for receiving permanent magnet 42, as shown in the embodiments of FIGS. 4B and 4C. In the embodiment of FIG. 4C, damper 30 further includes a base portion 31 for assembling damper 30 to a lower yoke 26 of hard disk drive 10. Base portion 31 includes a hole 33 for insertion of a screw 35 during assembly. Iron rod 34 extends outwardly from a central portion of a second end of damper 30, and has a rounded cap 37 positioned at a distal end.

In FIGS. 4B and 4C, groove 32 for receiving permanent magnet 42 has a depth sufficient to receive approximately one half of contact portion 46 of permanent magnet 42. In all embodiments, damper 30 may use a resilient rubber material for enhancing a damping effect.

Figure 5A:
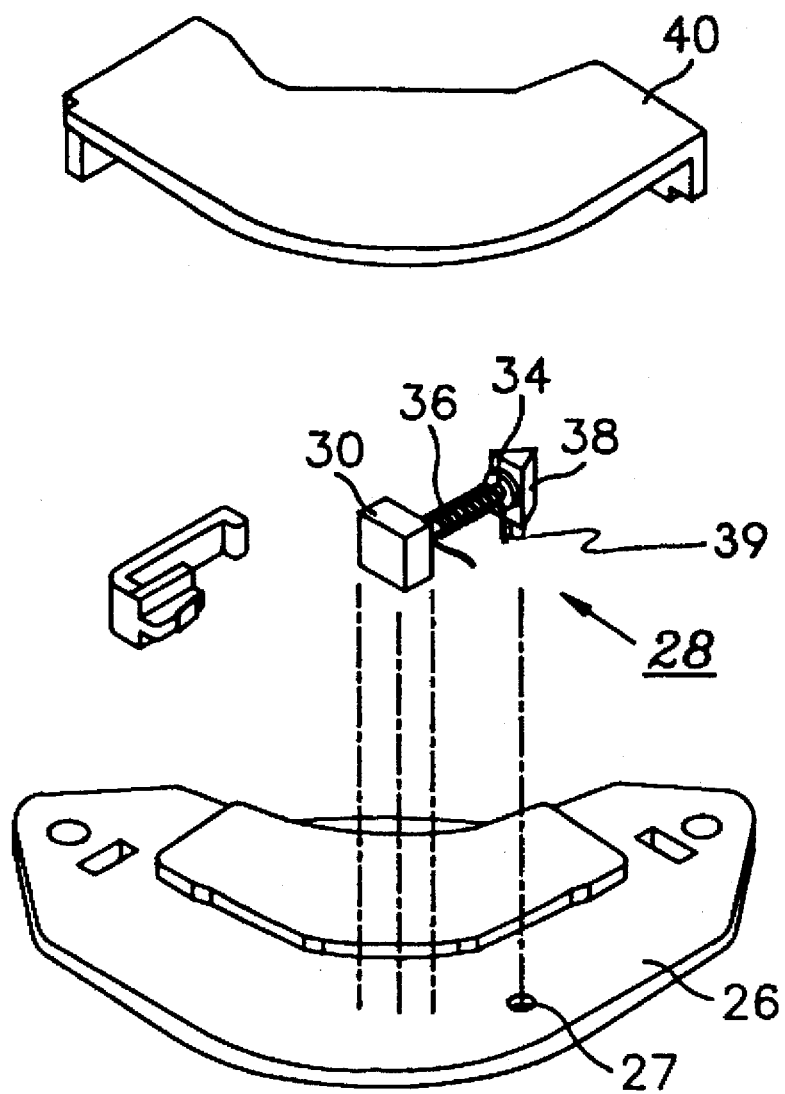
FIGS. 5A to 5C are exploded perspective views illustrating different assemblies of a lower yoke and several different embodiments of a solenoid latch constructed in accordance with the principles of the present invention.
Figure 5B:
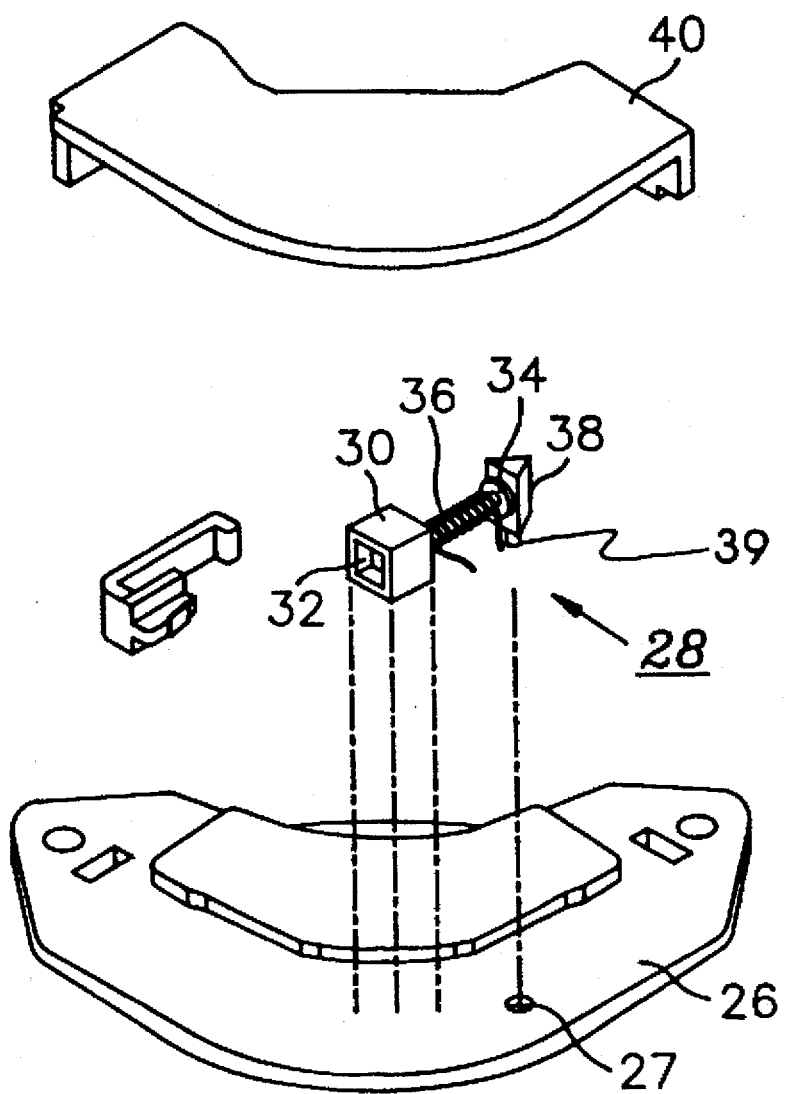
Figure 5C:
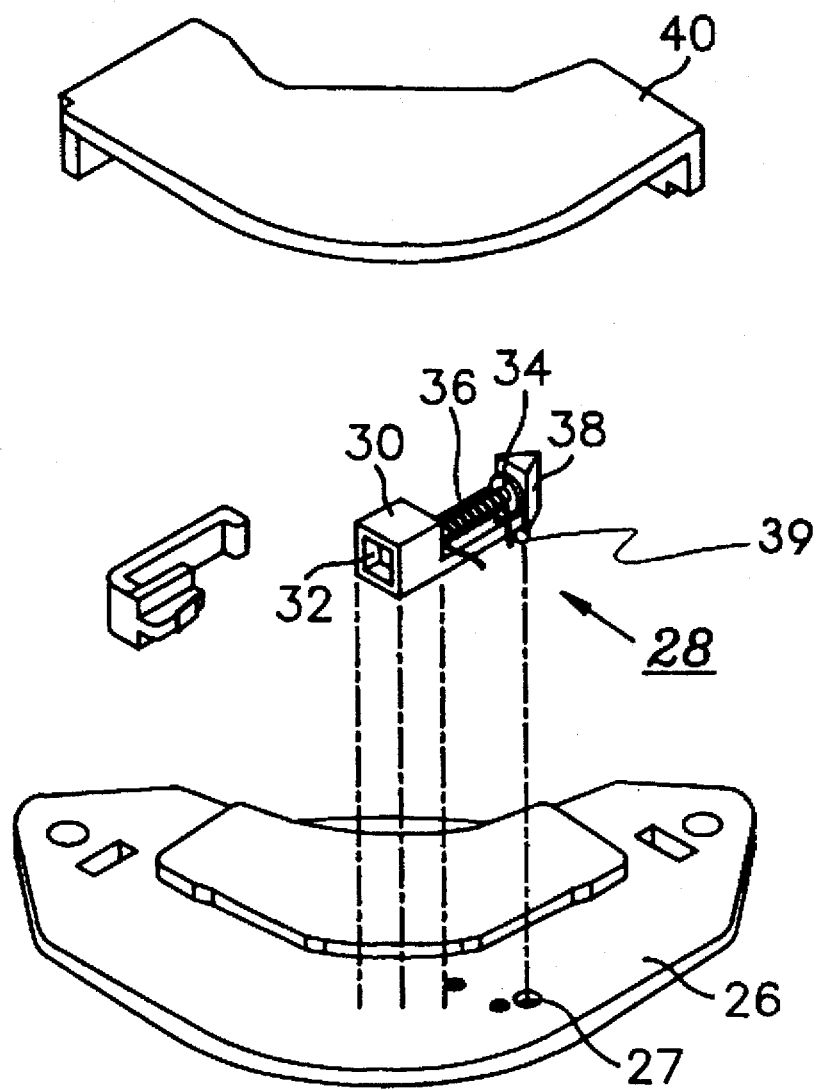

To prevent solenoid latch 28 from becoming displaced during a power-off procedure due to an impact between permanent magnet 42 and damper 30, a hard disk drive 10 constructed in accordance with the principles of the present invention includes lower yoke 26 having a supporter assembly groove 27 provided for inserting a supporter 38, as shown in FIG. 5A through 5C. Also, a cover 40 is provided for covering solenoid latch 28.

In the actuator fixing device of hard disk drive 10 constructed according to the principles of the present invention, assembly portion 44 of permanent magnet 42 is attached within assembly groove 24 of actuator 20 by using an adhesive material (see FIGS. 2 and 3).

While hard disk drive 10 is in operation, solenoid latch 28 for applying the repulsive force to permanent magnet 42 is connected to a predetermined position on lower yoke 26. In the embodiments of FIGS. 4A and 4B, damper 30 is assembled to lower yoke 26 by using an adhesive material. In the embodiment of FIG. 4C, damper 30 having base portion 31 is assembled to lower yoke 26 by inserting a fastener such as a threaded screw 35 into hole 33.

In all embodiments, the tab 39 extending downwardly from the base of supporter 38 is assembled into supporter assembly groove 27 of lower yoke 26, thereby preventing movement of solenoid latch 28.

Figure 6:
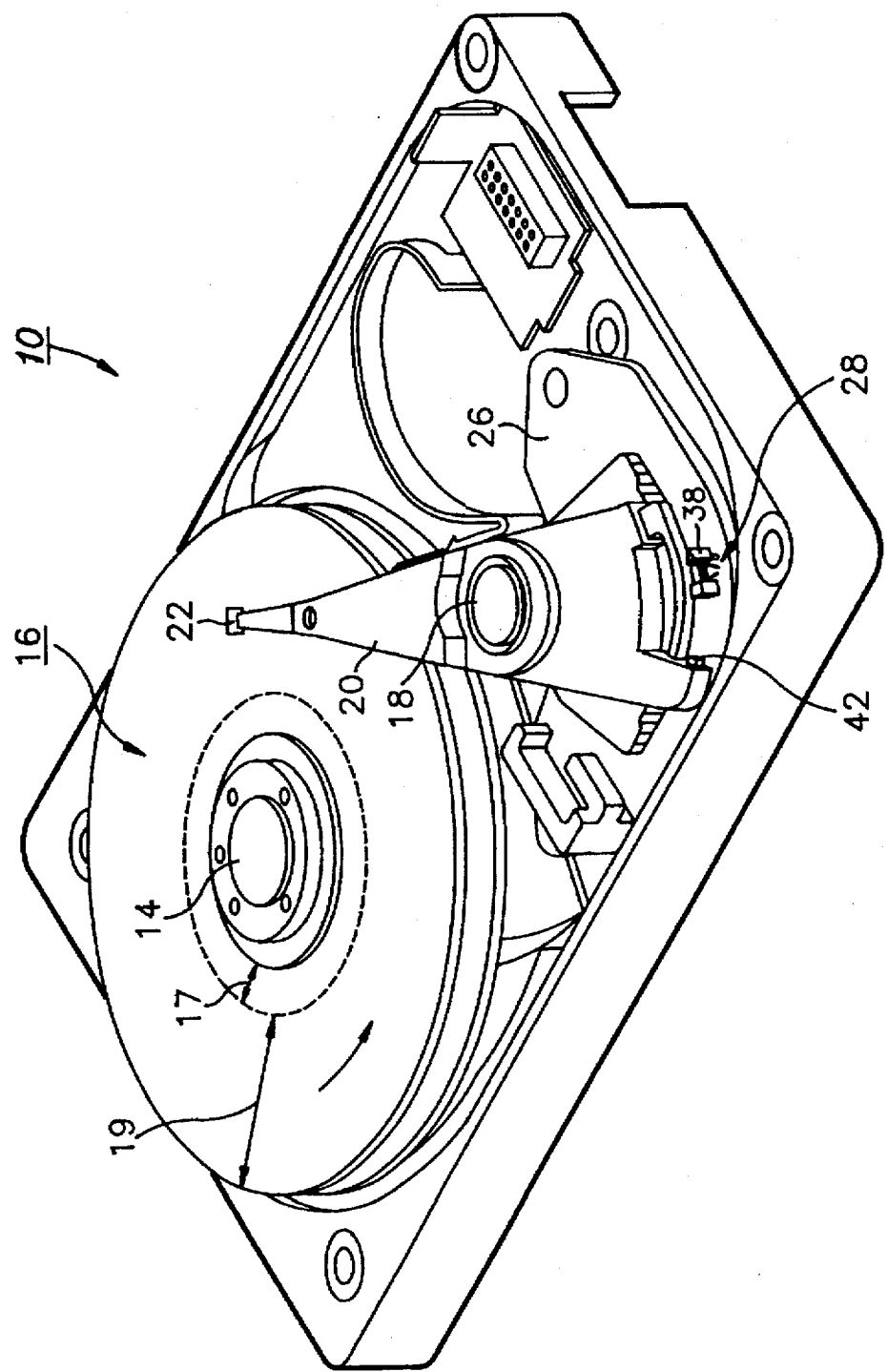
FIG. 6 is a perspective view illustrating the construction of a hard disk drive constructed according to the principles of the present invention.

In hard disk drive 10 of the present invention, when an electrical current is applied thereto, disk 16 rotates by a spindle motor 14, as is shown in FIG. 6. When disk 16 rotates at a constant speed, an airflow accompanying this rotation causes a head 22 of actuator 20 to float above the surface of disk 16. Then, if electrical current is applied to solenoid latch 28, an electromagnetic force generated from solenoid latch 28 acts upon permanent magnet 42 of actuator 20, thereby causing actuator 20 to rotate about a pivot 18. Accordingly, head 22 of actuator 20 moves from a parking zone 17 to a data zone 19.

During the power-off procedure, disk 16 gradually stops rotating, and actuator 20 rotates about pivot 18 through the reverse electromagnetic force to thereby move head 22 into parking zone 17 on disk 16. In this position, permanent magnet 42 attaches to solenoid latch 28.

As the magnetic force is increased, parking of head 22 in parking zone 17, and prevention of damage to data zone 19 attributable to head 22 escaping from parking zone 17 due to an external impact upon non-operation of hard disk drive 10 is facilitated. Also, since permanent magnet 42 has the same polarity as iron rod 34 of solenoid latch 28, permanent magnet 42 and solenoid latch 28 can be easily separated from each other when an electrical current is applied to coil 36 of solenoid latch 28.

As described above, the present invention has an advantage in that, since permanent magnet 42 exerts a repulsive force against solenoid latch 28 upon the application of electrical current, permanent magnet 42 and solenoid latch 28 exert a strong latching force towards each other during non-operation, and head 22 of actuator 20 can be easily moved to data zone 19 during operation of hard disk drive 10.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. An actuator fixing device of a hard disk drive, comprising:

an actuator having a permanent magnet integrally installed at a first end, wherein said permanent magnet is comprised of first and second portions, said first portion having a first size and exhibiting a first polarity, said second portion having a second size different from said first size and exhibiting a second polarity, said first portion being installed within said first end of said actuator to facilitate a connection between said permanent magnet and said actuator;

a solenoid latch comprised of a damper for buffering an impact resulting from contact between said permanent magnet and said damper, a coil for conducting an electrical current, and an iron rod extending outwardly from a first end of said damper and having said coil wrapped around a length of said iron rod to generate an electromagnetic force upon application of the electrical current to said coil, wherein said damper comprises a groove positioned within a second end of said damper opposite said first end, said groove having a shape for accommodating insertion of approximately one half of said second portion of said permanent magnet, and said iron rod extending outwardly from a central portion of said first end of said damper; and a yoke for accommodating installation of said solenoid latch within said hard disk drive, said iron rod exerting a first force upon said permanent magnet to separate said permanent magnet from said solenoid latch when the electrical current is applied to said coil, said iron rod exerting a second force upon said permanent magnet to magnetically attach said permanent magnet to said solenoid latch when the electrical current applied to said coil is interrupted.

2. The actuator restraining device as claimed in claim 1, wherein said damper is formed as a square plate, and said iron rod extends outwardly from a central portion of said first end of said damper.

3. The actuator restraining device as claimed in claim 2, wherein said damper is comprised of a rubber material.

4. The actuator fixing device as claimed in claim 1, wherein said damper is comprised of a rubber material.

5. An actuator fixing device of a hard disk drive, comprising:

an actuator having a permanent magnet integrally installed at a first end, wherein said permanent magnet is comprised of first and second portions, said first portion having a first size and exhibiting a first polarity, said second portion having a second size different from said first size and exhibiting a second polarity, said first portion being installed within said first end of said actuator to facilitate a connection between said permanent magnet and said actuator;

a solenoid latch comprised of a damper for buffering an impact resulting from contact between said permanent magnet and said damper, a coil for conducting an electrical current, and an iron rod extending outwardly from a first end of said damper and having said coil wrapped around a length of said iron rod to generate an electromagnetic force upon application of the electrical current to said coil, wherein said damper comprises:

a groove positioned within a second end opposite said first end, said groove having a shape for accommodating insertion of approximately one half of said second portion of said permanent magnet; and a base portion for connecting said damper to said yoke, said iron rod extending outwardly from a central portion of said first end of said damper; and a yoke for accommodating installation of said solenoid latch within said hard disk drive, said iron rod exerting a first force upon said permanent magnet to separate said permanent magnet from said solenoid latch when the electrical current is applied to said coil, said iron rod exerting a second force upon said permanent magnet to magnetically attach said permanent magnet to said solenoid latch when the electrical current applied to said coil is interrupted.

6. The actuator restraining device as claimed in claim 5, wherein said damper is comprised of a rubber material.

7. The actuator restraining device as claimed in claim 5, wherein said base portion comprises a hole to facilitate connection of said damper to said yoke via a screw.

8. An actuator fixing device of a hard disk drive, comprising:

an actuator having first and second ends, said actuator rotating to move a magnetic head positioned at said first end of said actuator between a parking zone and a data zone on a magnetic disk;

a permanent magnet positioned at said second end of said actuator; and a solenoid latch, comprising:

damping means for buffering an impact resulting from contact between said permanent magnet and said damping means when said actuator rotates to move said magnetic head into said parking zone on said magnetic disk;

an iron rod exhibiting a first length extending outwardly from a first end of said damping means; and an electrically conductive coil helically wrapped around and extending along said first length of said iron rod;

said actuator rotating to move said magnetic head to said data zone on said magnetic disk when an electrical current is provided to said electrically conductive coil, and said actuator rotating to move said magnetic head to said parking zone on said magnetic disk when the electrical current provided to said electrically conductive coil is interrupted;

said permanent magnet comprising:

a first portion having a first size for insertion into said second end of said actuator to facilitate a connection between said permanent magnet and said actuator; and a second portion having a second size different from said first size for contacting said damping means when said actuator rotates to move said magnetic head into said parking zone on said magnetic disk;

said damping means having a groove positioned within a second end opposite said first end, said groove having a shape conformed to receive approximately one half of said second portion of said permanent magnet when said actuator rotates to move said magnetic head into said parking zone on said magnetic disk.

9. The actuator fixing device of claim 8, further comprised said first portion of said permanent magnet exhibiting a first polarity, and said second portion of said permanent magnet exhibiting a second polarity opposite said first polarity.

10. The actuator fixing device of claim 8, further comprised of said damping means having a base portion to facilitate assembly of said damping means within said hard disk drive.

11. The actuator restraining device of claim 8, wherein said damping means is comprised of a rubber material.

12. An actuator restraining device of a hard disk drive, comprising:

an actuator having a magnetic head positioned at a first end and a permanent magnet positioned at a second end positioned opposite said first end, said actuator rotating to move said magnetic head between a parking zone and a data zone on a magnetic disk;

damping means having a first end and a second end positioned opposite said first end, said damping means for buffering an impact resulting from contact between said permanent magnet and said damping means when said actuator rotates to move said magnetic head into said parking zone on said magnetic disk;

an iron rod exhibiting a first length extending outwardly from said first end of said damping means; and an electrically conductive coil helically wrapped around and extending along said first length of said iron rod;

said permanent magnet comprising a first portion having a first size for insertion into said second end of said actuator to facilitate a connection between said permanent magnet and said actuator, and a second portion having a second size different from said first size for contacting said damping means when said actuator rotates to move said magnetic head into said parking zone on said magnetic disk;

a groove positioned within said second end of said damping means, said groove having a shape conformed to receive approximately one half of said second portion of said permanent magnet when said actuator rotates to move said magnetic head into said parking zone on said magnetic disk; and said actuator rotating to move said magnetic head to said data zone on said magnetic disk when an electrical current is provided to said electrically conductive coil, and said actuator rotating to move said magnetic head to said parking zone on said magnetic disk when the electrical current provided to said electrically conductive coil is interrupted.

13. The actuator restraining device of claim 12, further comprised of said damping means having a base portion to facilitate assembly of said damping means within said hard disk drive.

14. The actuator restraining device of claim 12, wherein said damping means is comprised of a rubber material.

15. The actuator restraining device of claim 12, further comprised said first portion of said permanent magnet exhibiting a first polarity, and said second portion of said permanent magnet exhibiting a second polarity opposite said first polarity.

16. The actuator restraining device of claim 15, further comprised of said damping means having a base portion to facilitate assembly of said damping means within said hard disk drive.

17. An actuator fixing device of a hard disk drive, comprising:

an actuator having a magnetic head installed on a first end and a permanent magnet installed on a second end positioned opposite to said first end, said actuator rotating to move said magnetic head between a parking zone and a data zone on a magnetic disk;

damping means having a first end and a second end positioned opposite to said first end, said damping means buffering an impact resulting from contact between said permanent magnet and said damping means at said second end of said damping means when said actuator rotates to move said magnetic head into said parking zone on said magnetic disk;

an iron rod exhibiting a first length extending outwardly from said first end of said damping means; and an electrically conductive coil helically wrapped around and extending along said first length of said iron rod;

said permanent magnet comprising a first portion having a first size inserted into said second end of said actuator, and a second portion having a second size different from said first size for contacting said damping means at said second end of said damping means when said actuator rotates to move said magnetic head into said parking zone on said magnetic disk;

said second end of said damping means having a groove formed therein, said groove having a shape conformed to receive said second portion of said permanent magnet when said actuator rotates to move said magnetic head into said parking zone on said magnetic disk; and said actuator rotating to move said magnetic head to said data zone on said magnetic disk when an electrical current is provided to said electrically conductive coil, and said actuator rotating to move said magnetic head to said parking zone on said magnetic disk when the electrical current provided to said electrically conductive coil is interrupted.

\* \* \* \* \*